United States Patent [19]

Zaiter

[11] Patent Number: 5,296,134
[45] Date of Patent: Mar. 22, 1994

[54] FILTRATION STRUCTURE FOR FLUID FLOW RADIALLY THROUGH CYLINDRICAL CONFIGURATION DEFINED BY STACK OF SERRATED WAFERS

[76] Inventor: Sohail Zaiter, 24 Old Farm Rd., Randolph, Mass. 02368

[21] Appl. No.: 844,472

[22] Filed: Mar. 2, 1992

Related U.S. Application Data

[63] Continuation-in-part of Ser. No. 588,572, Sep. 21, 1990, abandoned.

[51] Int. Cl.$^5$ .............................................. B01D 29/46
[52] U.S. Cl. ................................... 210/108; 210/131; 210/323.2; 210/352; 210/489; 55/482
[58] Field of Search ............... 210/323.2, 335, 336, 210/489, 490, 108, 131, 352; 55/482

[56] References Cited

U.S. PATENT DOCUMENTS 4,589,983  5/1986  Wydevan ........................... 210/317
4,686,041  8/1987  Van den Berg .................... 210/335
4,842,739  6/1989  Tang ................................. 210/489

Primary Examiner—Thomas Wyse
Attorney, Agent, or Firm—Morse, Altman, Dacey & Benson

[57] ABSTRACT

This invention is a filtration structure characterized by radial fluid flow through the wall of a cylindrical configuration that is established by a stack of serrated annular wafers which are constrained for slight axial movement with respect to each other, for the establishment of two conditions. In one condition, the wafers are axially compressed into snug contact under spring bias to establish a labyrinth of radial passages for fluid flow at a selected pressure. In the other condition, the axial compression of the disks is relieved and the disks are slightly separated by back flushing under an elevated pressure in such a way that cleansing is freely effected by reverse fluid flow.

13 Claims, 3 Drawing Sheets

FILTRATION STRUCTURE FOR FLUID FLOW RADIALLY THROUGH CYLINDRICAL CONFIGURATION DEFINED BY STACK OF SERRATED WAFERS

RELATED APPLICATIONS

BACKGROUND OF THE INVENTION

1. Field of the Invention

The present invention relates to the filtration of contaminated water and industrial waste fluids, and to systems for filtration of finely dispersed contaminants and waste products.

The present application is a continuation-in-part of application Ser. No. 07/588,572, filed Sep. 21, 1990 in the name of Sohail Zaite, now abandoned.

2. Background of the Invention

There have been proposed a variety of filtration structures characterized by fluid flow radially through the porous wall of a cylindrical configuration that is established by a stack of annular wafers. These wafers generally are characterized by opposed reticulated faces that establish a radial labyrinth of passages through which the fluid can pass between the interior and exterior surfaces of the cylindrical configuration. Such prior structures typically have been constituted by disposable packaging or have been prone to clogging problems, particularly when very fine particles have been involved.

SUMMARY OF THE INVENTION

The primary object of the present invention is to provide a filtration structure characterized by fluid flow radially through the wall of a cylindrical configuration that is established by a stack of serrated annular wafers which are constrained for slight axial movement with respect to each other for the establishment of two conditions. In one condition, the wafers are axially compressed into snug contact under spring bias to establish a labyrinth of radial passages for fluid flow at a selected pressure. In the other condition, the axial compression of the disks is relieved and the disks are slightly separated by back flushing under an elevated pressure in such a way that cleansing is freely effected by reverse fluid flow.

Preferably, the wafers are characterized by serrations which are skewed to intersect diameters through the center of the wafer at a selected angle. Preferably a plurality of columns of such wafers operate within a tank having two chambers that are separated by a hermetic plate. The columns are located within a first chamber and feed through ports in the plate into the second chamber. The arrangement is such that radial flow occurs into the outer peripheries of the tubular configurations in the first chamber, separation of impurities occurs in the interstices between the wafers, and axial flow of cleansed effluent occurs from the interstices into the interior of the columns and thence into the second chamber. The arrangement is such also that back flushing occurs from the second chamber through the interiors of the cylindrical configurations and from their external peripheries.

Other objects of the present invention will in part be obvious and will in part appear hereinafter.

BRIEF DESCRIPTION OF THE DRAWINGS

For a fuller understanding of the nature and objects of the present invention, reference is made to the following detailed description, in reference to the accompanying drawings wherein.

DETAILED DESCRIPTION OF THE PREFERRED EMBODIMENT

Figure 1:
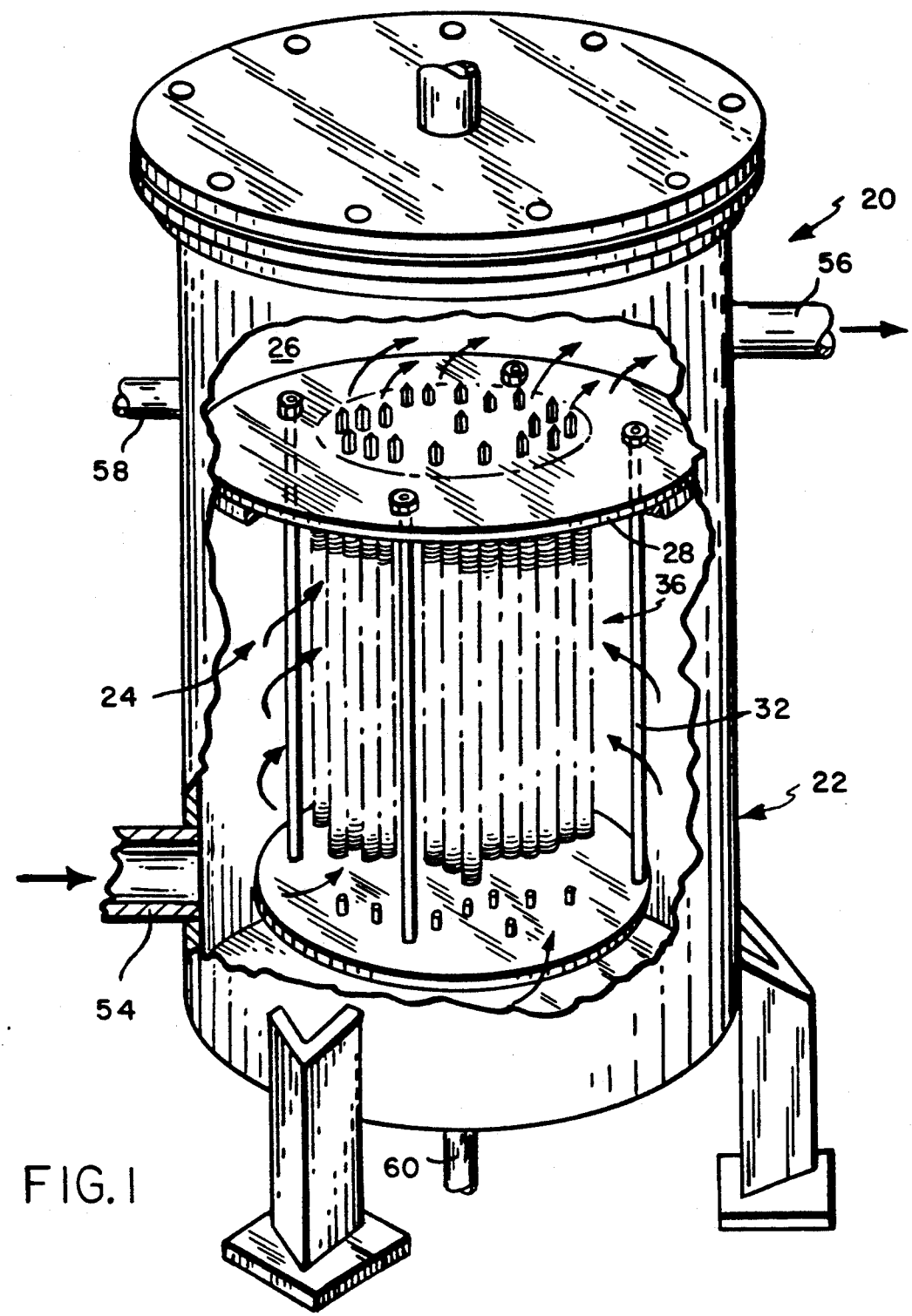
FIG. 1 is a perspective view of a water purifier embodying the present invention.
Figure 2:
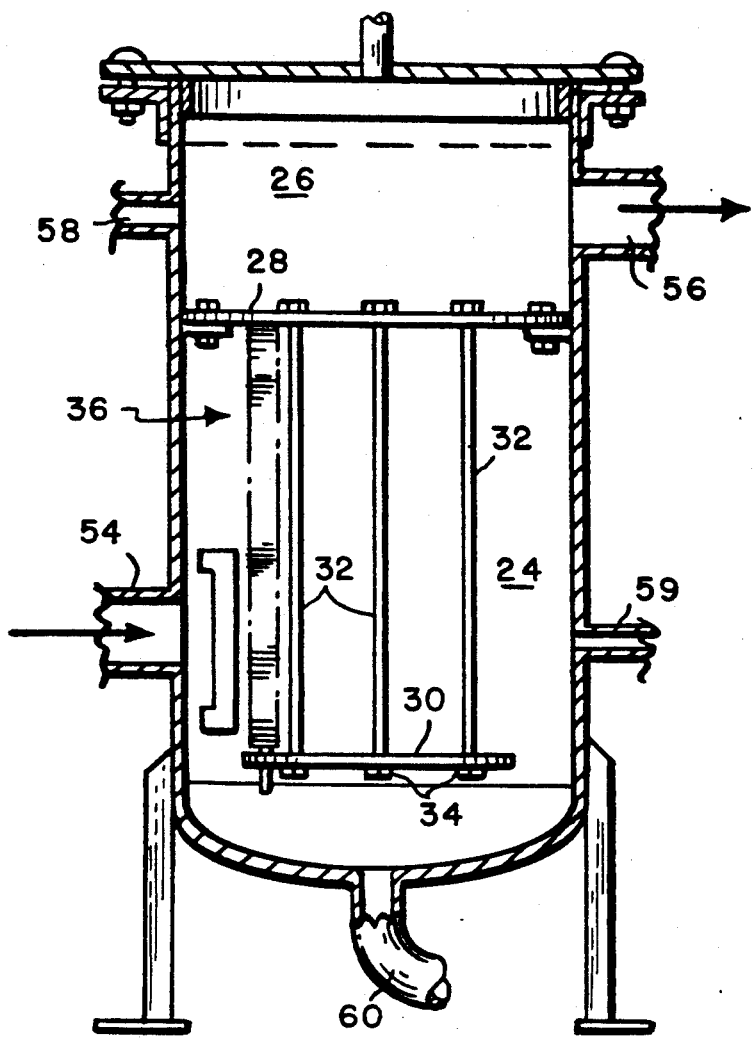
FIG. 2 is a broken away cross section of the purifier of FIG. 1, with parts omitted for clarity.
Figure 3:
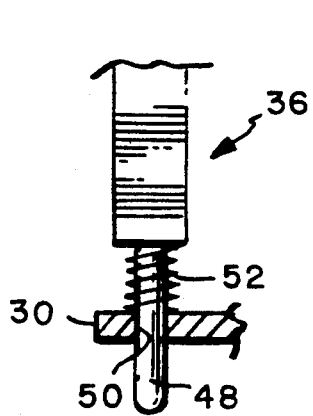
FIG. 3 is a broken away elevation of a component of the purifier of FIGS. 1 and 2.

With reference to FIGS. 1, 2, 3 and 4, the illustrated filtration unit 20 is shown as comprising a pressure vessel 22. Within this vessel are a lower chamber 24 and an upper chamber 26 which are separated by an upper plate 28. Positioned near the bottom of lower chamber 24 is a lower plate 30 which is hung from and secured to upper plate 28 by tie rods 32. Tie rods 32 have threaded extremities on which are turned suitable hex nuts 34. Extending between the plates are a series of paraxial tubular, filtration columns 36, each of which is constituted by a stack of thin, annular, plastic wafers 37. The opposite faces of the wafers are serrated in a manner to be described more specifically below.

Figure 4:
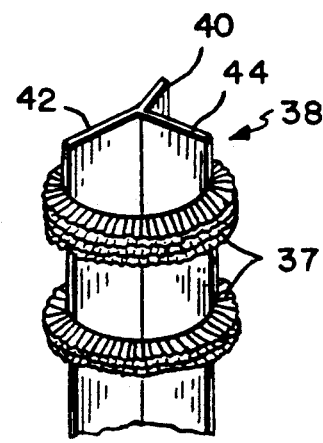
FIG. 4 is a perspective view of a broken-away stacked wafer sub-assemblage of the purifier of FIGS. 1 and 2.

As shown in FIG. 4, the inner profiles of these wafers snugly fit onto a vertical guide 38 that consists of three rigid planar ribs 40, 42 and 44 which are equiangularly disposed. In other words, in cross section, adjacent ribs are angularly spaced at 120° with respect to each other. The lower extremity of each vertical guide 38 is affixed by bonding or welding to a collar 46. The upper extremity of each vertical guide snugly extends through an opening in upper plate 28. Extending downwardly from collar 46 is a pin 48 which projects through and is reciprocable within an opening 50 in lower plate 30. A helical spring 52 envelops pin 48 and is compressed between collar 46 and lower plate 30.

The arrangement is such that an aqueous flow into lower chamber 24 through an entrance port 54 permeates each column 36 peripherally, and deposits any dispersed particles in the interstices defined by the serrations at the surfaces of the wafers. This flow continues into the interior of column 36, upwardly into upper chamber 26, and outwardly from exit port 56. The system is cleansed by backwashing through a flush port 58 at an elevated pressure which causes the wafers to separate against the bias of spring 52 and the particulate agglomeration at the faces of the wafers to dislodge for flushing through an outlet. A drain 60 is provided at the bottom of vessel 22 for residual sludge and the like.

EXAMPLE

The geometry of the wafers are shown in FIGS. 5A to 5F. As indicated above compressed stacks of these wafers constitute tubular filtering elements that are critical to the present invention. These wafers are manufactured to very tightly controlled tolerances.

Figure 5A:
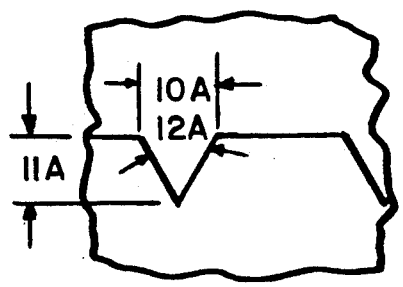
FIG. 5A is a partly broken away, enlarged detail cross-sectional view of a portion of a wafer of FIG. 4.
Figure 5B:
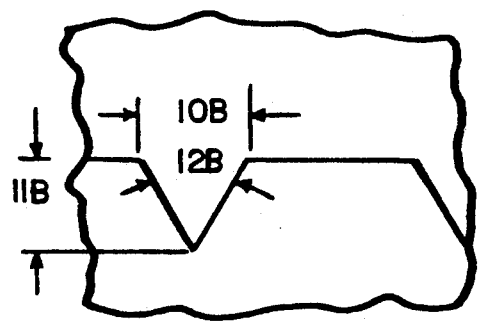
FIG. 5B is a partly broken away, enlarged detail cross-sectional view of another portion of the wafer of FIG. 4.
Figure 5C:
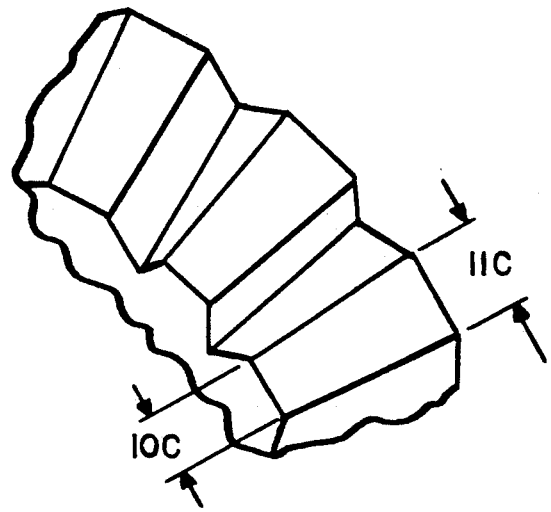
FIG. 5C is a perspective view of a fragmentary detail of the wafer of FIGS. 5A and 5B.
Figure 5D:
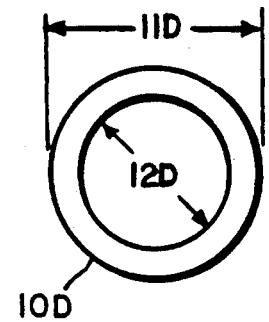
FIG. 5D is a plan view of the wafer of FIGS. 5A and 5B.
Figure 5E:
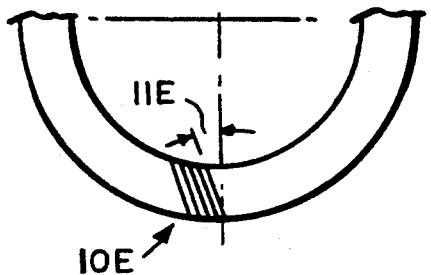
FIG. 5E is a broken-away plan view of FIG. 5D, enlarged to show added details.
Figure 5F:
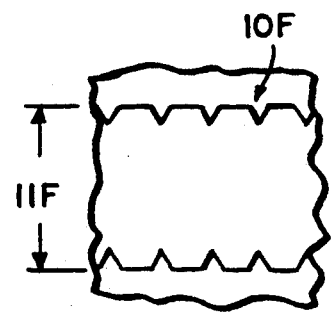
FIG. 5F is a grossly magnified, broken-away cross-section of the wafer of FIGS. 5A and 5B.

As shown in FIGS. 5A and 5B, dimensions 10A and 10B (0.00322 and 0.00995) are the passage widths at the inlet and outlet diameters, respectively. Dimensions 11A and 11B (0.00252 and 0.00602) are the passage depths at the inlet and outlet diameters, respectively. As shown in FIG. 5C, dimensions 10C and 11C (0.00425 and 0.00509) are the landing widths at the inlet and outlet diameters, respectively. As shown in FIG. 5E, the passages are equally distributed on the annular area surfaces at an angle 11E (18° to 28°) with respect to a diameter line through the center of the wafer. As shown in FIGS. 5A and 5B, the passages define equilateral, triangular, cross-sectional contours. The passages are molded into both faces of the wafer, which has a thickness of from 0.020 to 0.040 inch. Preferably, the wafers are composed of a high density polymer, particularly, a high density polypropylene, polycarbonate, fluoropolymer, nylon, kadel or radel.

In one example of the illustrated embodiment, each wafer is 0.032 inch thick and has an outer diameter of 1.375 inches and an inner diameter of 1 inch. The vessel is approximately 19 inches in diameter. The wafer columns include several hundred randomly oriented wafers each and the guides are approximately 20 inches long.

Reticulation sizes are the critical factor in determining the largest particle allowed to pass. Hence, the smaller the reticulation size, the higher the filtering effect. With reference to FIGS. 5A to 5F, filtering effects of 10 micron, 20 micron, 30 micron and 40 micron are shown below. Columns, in various embodiments, have different numbers of elements, which correspond to the rate of flow required. Table 1 shows flow rates corresponding to various numbers of columns, elements and vessel sizes.

TABLE I

| NO. OF COLUMNS | NO. OF ELEMENTS | FLOW RATE M³/HR. | | | | VESSEL DIA. (in.) |
|---|---|---|---|---|---|---|
| | | 10 MIC. | 20 MIC. | 30 MIC. | 40 MIC. | |
| 1 | 300 | 2 | 5 | 7.5 | 10 | 4 |
| 3 | 500 | 5 | 12.5 | 18.5 | 25 | 6 |
| 6 | 300 | 12 | 30 | 45 | 60 | 10 |
| 6 | 500 | 20 | 50 | 75 | 100 | 10 |
| 12 | 300 | 25 | 60 | 90 | 120 | 12 |
| 12 | 500 | 35 | 90 | 135 | 180 | 12 |
| 18 | 500 | 60 | 150 | 225 | 300 | 14 |
| 36 | 400 | 90 | 225 | 337 | 450 | 16 |
| 36 | 500 | 115 | 300 | 450 | 600 | 16 |
| 60 | 400 | 150 | 400 | 600 | 800 | 20 |
| 60 | 500 | 200 | 500 | 750 | 1000 | 20 |

OPERATION

Operation is as follows in reference to pressure vessel 20, service inlet valve 54, product outlet valve 56, drain valve 60, backflush inlet valve 58, backflush outlet valve 59, and pressure gauges (not shown). Liquid to be filtered enters the vessel at a pressure of 40–100 psi. By virtue of this pressure, the liquid is forced through the wafer interstices and through their interiors to the outlet chamber. Helical spring 52 is sufficiently strong to maintain tight contact between the wafer when the liquid is at this pressure. This portion of the operation continues until the differential pressure between the inlet and outlet chamber exceeds 20 psi. At this point, a backwash cycle begins. Backwashing is carried out manually or automatically. In the automatic mode, an initiation signal from differential pressure switches at the inlet and outlet valve activates the sequence of operations shown below in Table II.

TABLE II

| STEP | OPERATION | INLET | OUTLET | AIR VENT | BACK FLUSH | DRAIN | DURATION (mins.) |
|---|---|---|---|---|---|---|---|
| 1 | Preparation | OPEN | CLOSE | OPEN | CLOSE | CLOSE | |
| 2 | Service | OPEN | OPEN | CLOSE | CLOSE | CLOSE | |
| 3 | Backwash | CLOSE | CLOSE | CLOSE | OPEN | OPEN | 2.0 |
| 4 | Rinse | OPEN | CLOSE | CLOSE | CLOSE | CLOSE | 0.5 |

To ensure that the backwash cycle is initiated and completed, a control panel (not shown) annunciates the following: (1) indicator light illuminates showing high delta in pressure; (2) delayed flushing operation resumes after allowing the closure of valves 54, 56 and 60; (3) cycle indicator light (BACKWASH-ON) illuminates and remains "ON" during the timed cycle (0–2 minutes); (4) when backwash cycle ends, a delayed step takes place (RINSE CYCLE); (5) indicator light goes on while valves are changing status; (6) after 0.5 minutes of rinse cycle, the system returns to service cycle.

In the manual mode operation, the above sequences are carried out by an operator through the initiation of system shutdown and hand operation of the various valves in a sequence analagous to the one described above.

The present invention thus provides a unique design of a filtering element made from polypropylene, polycarbonate, flouropolymer, nylon, kadel or radel having specially designed passageways which act as a filtering labyrinth when stacked on top of each other. These passageways are sized for filter ratings of 10 micron, 20 micron, 30 micron and 40 micron. The filter system has a unique spring loading effect which allows successful backwash of the filtering elements. Backwashing: for a 10 micron rating is characterized by flow rates varying from 2 M³/Hr to 200 M³/Hr; for a 20 micron rating is characterized by rates varying from 5 M³/Hr to 500³/Hr; for a 30 micron rating is characterized by flow rates varying from 7.5 M³/Hr to 750 M³/Hr; and for a 40 micron rating is characterized by flow rates varying from 10 M³/Hr to 1000 M³/Hr.

What is claimed is:

1. A filtration structure comprising:
   (a) at least one column of discrete annular wafers;
   (b) each wafer having an exterior profile and an interior profile;
   (c) each wafer being composed of a dimensionally stable polymer;
   (d) faces of said wafers having serrations;

(e) a guide projecting through the interior profiles of said wafers;
(f) said guide having ribs in contact with said interior profiles;
(g) said wafers defining a tube having an exterior surface and an interior surface;
(h) said exterior surface and said interior surface being adapted to communicate through interstices defined by said serrations;
(i) said interstices serving as a filter for a liquid flowing at an operating pressure between said exterior surface and said interior surface;
(j) a spring connected with said wafers and said guide such that said wafers are capable of movement along said guide between two conditions, the first condition being intimate contact under spring pressure, and the second condition being slight separation when said spring pressure is countered by fluid pressure greater than a given fluid pressure.

2. The filtration structure of claim 1 wherein said serrations angularly intersect diameters of said wafers.

3. The filtration structure of claim 2 wherein said serrations angularly intersect diameters of said wafers at angles ranging from 18° to 28°.

4. The filtration structure of claim 1 wherein said polymer is a high density polymer selected from the class consisting of polypropylene, polycarbonate, fluoropolymer, nylon, kadel and radel.

5. The filtration structure of claim 1 wherein said polymer is high density polypropylene.

6. A filtration system comprising:
(a) a pressure vessel having a first chamber and a second chamber;
(b) a plate separating said first chamber and said second chamber;
(c) a plurality of filtration columns in said first chamber;
(d) each of said filtration columns defining an exterior periphery communicating with said first chamber and an interior periphery communicating with said second chamber;
(e) each of said columns comprising a stack of annular wafers;
(f) at least one column of discrete annular wafers;
(g) each wafer having an exterior profile and an interior profile;
(h) each wafer being composed of a dimensionally stable polymer;
(i) faces of said wafers having serrations;
(j) a guide projecting through the interior profiles of said wafers;
(k) said guide having ribs in contact with said interior profiles;
(l) said exterior periphery and said interior periphery being adapted to communicate through interstices defined by said serrations;
(m) said interstices serving as a filter for a liquid flowing at an operating pressure between said exterior surface and said interior surface;
(n) a spring connected with said wafers and said guide such that said wafers are capable of movement along said guide between two conditions, the first condition being intimate contact under spring pressure, and the second condition being slight separation when said spring pressure is countered by fluid pressure greater than a given fluid pressure;
(o) during said first condition said wafers being in an arrangement that is favorably suitable for filtering fluids and during said second condition said wafers being in an arrangement that is favorably suitable for the cleansing of contaminated wafers.

7. The filtration system of claim 6 wherein said serrations angularly intersect diameters of said wafers.

8. The filtration structure of claim 7 wherein said serrations angularly intersect diameters of said wafers at angles ranging from 18° to 28°.

9. The filtration structure of claim 6 wherein said polymer is a high density polymer.

10. The filtration structure of claim 6 wherein said polymer is high density polypropylene.

11. A filtration system comprising:
(a) a pressure vessel having a first chamber and a second chamber;
(b) a plate separating said first chamber and said second chamber;
(c) a plurality of filtration columns in said first chamber;
(d) each of said filtration columns defining an exterior periphery communicating with said first chamber and an interior periphery communicating with said second chamber;
(e) each of said columns comprising a stack of annular wafers;
(f) at least one column of discrete annular wafers;
(g) each wafer having an exterior profile and an interior profile;
(h) each wafer being composed of a dimensionally stable polymer;
(i) faces of said wafers having serrations;
(j) a guide projecting through the interior profiles of said wafers;
(k) said guide having ribs in contact with said interior profiles;
(l) said exterior periphery and said interior periphery being adapted to communicate through interstices defined by said serrations;
(m) said interstices serving as a filter for a liquid flowing at an operating pressure between said exterior surface and said interior surface;
(n) said serrations angularly intersecting diameters of said wafers at angles ranging from 18° to 28°;
(o) a spring connected with said wafers and said guide such that said wafers are capable of movement along said guide between two conditions, the first condition being intimate contact under spring pressure, and the second condition being slight separation when said spring pressure is countered by fluid pressure greater than a given fluid pressure;
(p) during said first condition said wafers being in an arrangement that is favorably suitable for filtering fluids and during said second condition said wafers being in an arrangement that is favorably suitable for the cleansing of contaminated wafers.

12. A filtration structure comprising:
(a) at least one column of discrete annular wafers;
(b) each wafer having an exterior profile and an interior profile;
(c) each wafer being composed of a dimensionally stable polymer;
(d) faces of said wafers having serrations;
(e) a guide projecting through the interior profiles of said wafers;
(f) said guide having ribs in contact with said interior profiles;
(g) said wafers defining a tube having an exterior surface and an interior surface;

(h) said exterior surface and said interior surface being adapted to communicate through interstices defined by said serrations;
(i) said interstices serving as a filter for a liquid flowing at an operating pressure between said exterior surface and said interior surface;
(j) a spring connected with said wafers and said guide such that said wafers are capable of movement along said guide between two conditions, the first condition being intimate contact under spring pressure, and the second condition being slight separation when said spring pressure is countered by fluid pressure greater than a given fluid pressure;
(k) during said first condition said wafer being in an arrangement that is favorably suitable for filtering fluids and during said second condition said wafers being in an arrangement that is favorably suitable for the cleansing of contaminated wafers; and
(l) oscillation means for causing said movement between two said conditions.

13. A filtration structure comprising:
(a) at least a column of discrete annular wafers;
(b) each wafer having an exterior profile and an interior profile;
(c) each wafer being composed of a dimensionally stable polymer;
(d) faces of said wafers having serrations;
(e) a guide projecting through the interior profiles of said wafers;
(f) said guide having ribs in contact with said interior profiles;
(g) said wafers defining a tube having an exterior surface and an interior surface;
(h) said exterior surface and said interior surface being adapted to communicate through interstices defined by said serrations;
(i) said interstices serving as a filter for a liquid flowing at an operating pressure between said exterior surface and said interior surface;
(j) spring means connected with said guide and said wafers such that said wafers are capable of movement along said guide between two conditions, the first condition being intimate contact under spring pressure, and the second condition being slight separation when said spring pressure is countered by fluid pressure greater than a given fluid pressure;
(k) during said first condition said wafers being in an arrangement that is favorably suitable for filtering fluids and during said second condition said wafers being in an arrangement that is favorably suitable for the cleansing of contaminated wafers;
(l) oscillation means for causing said movement between said two conditions;
(m) said movement being related to the spring constant of said spring and the distance the wafers travel between said first condition and said second condition.

* * * * *